US005673931A

United States Patent [19]
Gray et al.

[11] Patent Number: 5,673,931
[45] Date of Patent: Oct. 7, 1997

[54] COVER ASSEMBLY

[75] Inventors: John D. Gray, Union, N.H.; Michael Larson, Macomb Township, Mich.; Salvatore J. Moceri, Rochester, Mich.; Michael Gorman, Bloomfield Twp., Mich.

[73] Assignee: Davidson Textron Inc., Dover, N.H.

[21] Appl. No.: 561,545

[22] Filed: Nov. 22, 1995

[51] Int. Cl.⁶ .................................................. B60R 21/16
[52] U.S. Cl. ...................................... 280/728.3; 280/728.1
[58] Field of Search ............................... 280/728.3, 728.1

[56] References Cited

U.S. PATENT DOCUMENTS

| | | | |
|---|---|---|---|
| 4,327,937 | 5/1982 | Scholz et al. | 280/732 |
| 4,893,833 | 1/1990 | DiSalvo et al. | 280/728.3 |
| 5,421,608 | 6/1995 | Parker et al. | 280/728.3 |
| 5,433,474 | 7/1995 | Farrington et al. | 280/728.3 |
| 5,447,328 | 9/1995 | Iannazzi et al. | 280/728.3 |
| 5,478,107 | 12/1995 | Yamagishi et al. | 280/728.3 |
| 5,531,471 | 7/1996 | Terai | 280/728.3 |

Primary Examiner—Eric D. Culbreth
Attorney, Agent, or Firm—Reising, Ethington, Barnard & Perry

[57] ABSTRACT

A cover assembly for concealing an air bag restraint system in a vehicle passenger compartment has an underlying support and air bag door substrate. The door substrate is held in the closed position by flexible tabs that are disposed in a slot at the confronting edge of the support. When the air bag inflates, it engages the door substrate and pushes the tabs out of the slot to release the door substrate. The door substrate then swings open rupturing the covering to provide an opening through the cover assembly for deployment of the air bag.

6 Claims, 1 Drawing Sheet

COVER ASSEMBLY

BACKGROUND OF THE INVENTION

This invention relates generally to air bag restraint systems and more particularly to a cover assembly for concealing an air bag restraint system in a vehicle passenger compartment.

U.S. Pat. No. 4,327,937 granted to Hansjurgen Scholz et al May 4, 1982 discloses a downwardly foldable covering for a gas cushion. The covering consists of a padding layer which has a mesh reinforcement of very strong synthetic plastic material surrounded by the foamed material of the padding layer. The padding layer is covered by an outer decorative film and an inner film and terminates in a flange that fits in a groove of a body part to provide an anchoring arrangement at the detached end of the covering. When the gas cushion inflates, the covering initially curves outwardly until the flange is free of the groove. The covering then pivots downwardly with a lower deformable part serving as a hinge.

U.S. Pat. No. 4,893,833 granted to Anthony J. DiSalvo et al Jan. 16, 1990 discloses a first embodiment of a closure for an air bag deployment opening in which the closure comprises a foam core body that has a tab at the front end. The tab is disposed in a recess formed in the adjacent instrument panel structure to provide an anchoring arrangement at the detached end of the closure. The tab is sheared off to free the detached end of the closure when the closure is pushed open by the inflating air bag.

The covering and closure disclosed in these respective patents are separate door arrangements in which a decoratively covered door is manufactured substantially completely and then assembled to an instrument panel or other automotive trim panel.

These separate door arrangements have in large part been replaced by invisible or integral air bag door arrangements wherein the decorative outer covering of the door is an integrated part of the decorative outer covering of the instrument or trim panel. These invisible or integrated air bag door arrangements are more aesthetically pleasing because gaps between the door and the trim panel are eliminated along with problems associated with color and grain match.

The anchoring arrangements disclosed in the patents discussed above may be suitable for their intended purpose, that is, to anchor the detached end of a separate decoratively covered door that is manufactured substantially completely and then attached to the instrument or trim panel. However the anchoring arrangements are not particularly well suited for an integrated or invisible air bag door arrangement.

SUMMARY OF THE INVENTION

The object of this invention is to provide a cover assembly for concealing an air bag restraint system in which a door substrate and an underlying support of a trim panel cooperate to anchor a detached end of the door.

Such an anchoring arrangement has several advantages including that of being particularly well suited in connection with the manufacture of integrated or invisible air bag door arrangements.

Another feature and advantage of the invention is that the detached end of the door substrate is locked to the adjacent edge of the trim panel substrate by flexible tabs that remain attached to the door substrate when the air bag is deployed.

Another feature and advantage of the invention is that the detached end of the door substrate is locked or anchored to the adjacent edge of the trim panel support by depressed tabs so that the door substrate is flush with adjacent portion of the trim panel support and less discernable beneath the decorative covering.

Still another feature and advantage of the invention is that the detached end of the door substrate is locked or anchored to the adjacent edge of the trim panel substrate by tabs that are connected to the detached end of the door substrate by webs that are flexible enough to release the tabs from the trim panel support when the air bag is deployed yet strong enough to keep the tabs connected to the door substrate during air bag deployment.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
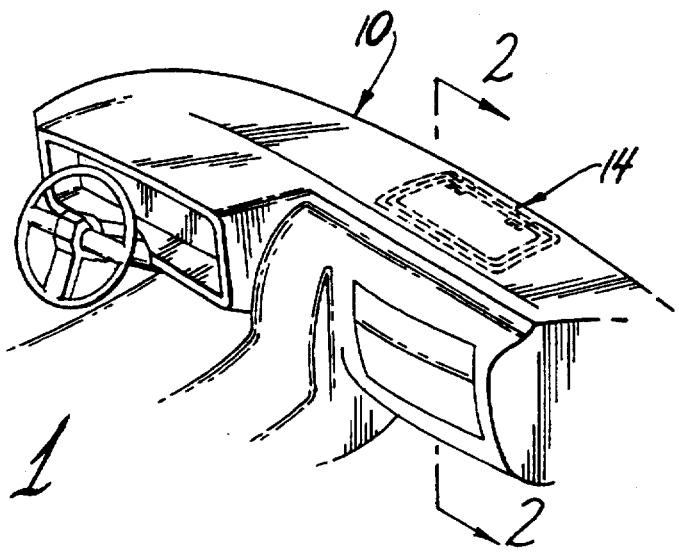
FIG. 1 is a perspective view of an instrument panel assembly including a cover assembly in accordance with this invention.
Figure 2:
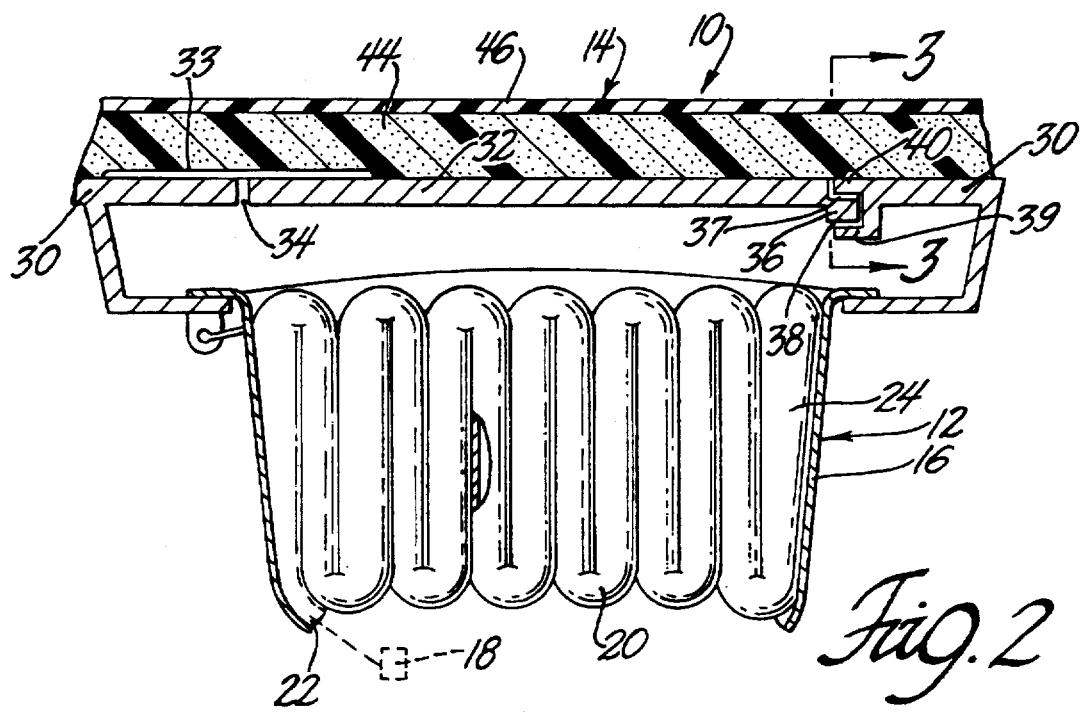
FIG. 2 is a fragmentary sectional view taken substantially along the line 2—2 of FIG. 1 looking in the direction of the arrows.
Figure 3:
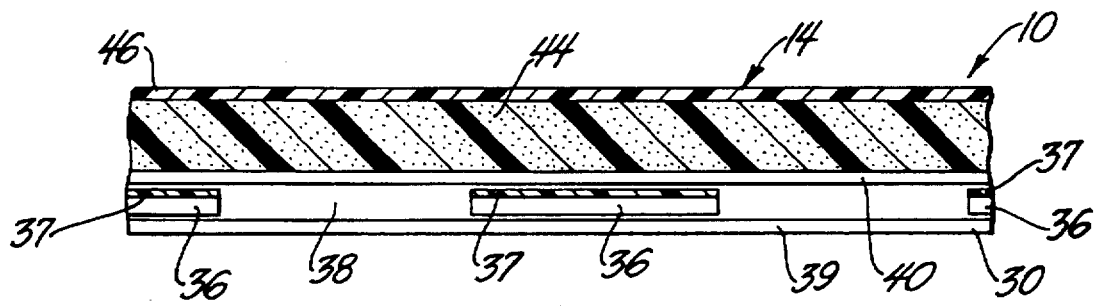
FIG. 3 is a fragmentary sectional view taken substantially along the line 3—3 of FIG. 2 looking in the direction of the arrow.

Referring now to the drawing, FIGS. 1, 2 and 3 show an instrument panel 10 having an air bag restraint system 12 located beneath a cover assembly 14 constructed in accordance with this invention. In this particular instance, the air bag restraint system 12 is located beneath a shelf portion of the instrument panel on the passenger side of the vehicle. However the cover assembly 14 of this invention can be used on the driver side as part of the steering wheel; on either side as part of a front or passenger facing portion of the instrument panel; or as part of any other decorative panel in the passenger compartment.

The air bag restraint system 12 includes an air bag housing 16 that encloses a gas generator 18 for supplying an inflatant to an air bag 20 that is collapsed, folded and packed in the housing 16. The folded air bag 20 includes an inlet end 22 connected to a passage for flow of the inflatant from the gas generator 18 into the air bag. The air bag also includes a nose end 24 at the opposite end of the folds that is positioned to open the cover assembly 14 of this invention when the air bag 20 inflates.

The cover assembly 14 comprises a support or substrate 30 of structural plastic or other relatively stiff material that is secured beneath the instrument panel 10 preferably by being insert molded as part of the instrument panel itself. A door substrate 32 of suitable structural material such as structural plastic or aluminum is attached to the panel substrate 30 by a hinge 33 at the forward end of the door substrate 32 which is closest to the windshield of the vehicle. The door substrate 32 closes a rectangular air bag opening 34 in the support 30 when the door substrate 32 is closed as shown in FIG. 2. The detached rearward end of the door substrate 32 that is closest to the vehicle passengers has a plurality of laterally spaced locking tabs 36. As shown in FIG. 2, the locking tabs 36 are depressed inwardly with respect to the door substrate 32 toward the air bag restraint system 12 that is located beneath the cover assembly 12. As a result of the depression, the locking tabs 32 are integrally connected to the detached front end of the door substrate 32 by webs 37 that are thinner than the door substrate 32.

The panel support or substrate 30 has a slot 38 at the edge of the air bag opening 34 which confronts the detached end of the door substrate 32. The slot 38 receives the locking tabs 36 and traps the locking tabs 36 between inner and outer lips 39 and 40 of the panel support 30 that define the slot 38. The inner lip 39 supports the locking tabs 36 and resists movement of the door substrate 32 inwardly toward the air bag restraint system 12 from the closed position shown in FIG. 2. The outer lip 40 retains the locking tabs 36 and resists movement of the door substrate 32 outwardly from the closed position shown in FIG. 2. Thus the door substrate 32 is locked in the closed position by the locking tabs 34 at the detached rearward end of the substrate 32. The locking tabs 34 and lips 39 and 40 are designed to resist movement of the door substrate 32 when the cover assembly 14 is being manufactured and when the cover assembly 14 is subjected to normal use in a vehicle taking anticipated passenger abuse into account.

The outer surface of the panel support 30 and the hinged door substrate 32 is bonded to a layer of suitable energy absorbing elastomeric foam, such as urethane foam that forms a cushion 44 in an underlying relationship to a polymeric skin or shell 46 of vinyl or the like that forms an outer decorative surface of the instrument panel 10. The skin 46 may have break lines, tear lines or weakened sections that are aligned with the front end and sides of the door substrate 32. These break lines, tear lines or weakened sections are preferably visually imperceivable from the exterior of the instrument panel 10 so as not to detract from its aesthetic appearance.

The support 30 of the cover assembly 14 has a portion that holds the air bag housing 16 beneath the rectangular opening 34 in spaced alignment with the door substrate 32.

The cover assembly 14 operates in the following manner. When the gas generator 18 is triggered due to vehicle deceleration of a given magnitude, the air bag 20 inflates at the nose end 24 first and then progressively back toward the inlet end 22. Consequently the nose end 24 engages the door substrate 32 and the initial load of the inflating air bag pushes the door substrate 32 outwardly so that the locking tabs 36 flex primarily at the webs 37 and pull out of the slot 38. After the locking tabs 36 are free of slot 38 the door substrate 32 then ruptures the cushion 44 and the shell 46 at the rear and sides of the door 32 as the door substrate 32 continues outward movement by the force of the inflating air bag 20 until the door substrate 32 and its covering hit the windshield.

While three laterally spaced locking tabs 36 have been illustrated, it should be noted that the size and number of locking tabs 36 can be varied to meet the particular needs of the materials that are used in the door substrate 32, the cushion 44 and the skin 46 of the instrument panel 10.

Moreover, the thickness of the webs 37 can be varied to meet the particular needs of the construction so that the webs 37 are flexible enough to release the locking tabs 36 from the slot 38 yet strong enough to keep the lock tabs 36 connected to the door substrate 32 when the air bag 20 is deployed.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A cover assembly for concealing an air bag in a vehicle passenger compartment comprising:

a support having an outer surface that is adapted for securement beneath a decorative panel in a vehicle passenger compartment;

a door substrate that closes a rectangular opening in the support for deployment of an air bag;

the door substrate having an end that is connected to the support by a hinge and a detached end that is juxtaposed to a confronting edge of the support when the door substrate is closed;

the outer surface of the support and the hinged door substrate being bonded to an elastomeric cushion formed in an underlying relationship to a polymeric skin that forms an outer surface of the decorative panel; and the detached end of the door substrate having a number of locking tabs that are disposed in a slot of the support at the confronting edge of the support to lock the door substrate in the closed position.

2. The cover assembly as defined in claim 1 wherein the locking tabs flex and pull out of the slot when the door substrate is impacted by an inflating air bag.

3. The assembly as defined in claim 2 wherein the locking tabs are integrally connected to the detached end of the door substrate by webs that are thinner than the door substrate.

4. The cover assembly as defined in claim 2 wherein the locking tabs are depressed with respect to the door substrate so that the locking tabs are integrally connected to the detached end of the door substrate by thin webs and the door substrate is substantially flush with adjacent surfaces of the support.

5. The cover assembly as defined in claim 1 wherein the locking tabs are depressed with respect to the door substrate so that the door substrate is substantially flush with adjacent surfaces of the support.

6. A cover assembly for concealing an air bag in a vehicle passenger compartment comprising:

a support having an outer surface that is adapted for securement beneath a decorative panel in a vehicle passenger compartment;

a door substrate that closes a rectangular opening in the support for deployment of an air bag;

the door substrate having an end that is connected to the support by a hinge and a detached end that is juxtaposed to a confronting edge of the support when the door substrate is closed;

the outer surface of the support and the hinged door substrate being bonded to an elastomeric cushion formed in an underlying relationship to a polymeric skin that forms an outer surface of the decorative panel;

the detached end of the door substrate having a number of locking tabs that are disposed in a slot of the support at the confronting edge of the support to lock the door substrate in the closed position and that flex and pull out of the slot when the door substrate is impacted by an inflating air bag, the locking tabs being depressed with respect to the door substrate so that the locking tabs are integrally connected to the detached end of the door substrate by thin webs and the door substrate is substantially flush with the outer surface of the support, and the slot being defined by an outer lip of the support that is substantially flush with the outer surface of the support and an inner lip that is spaced inwardly of the outer lip.

* * * * *